(12) United States Patent
Trim et al.

(10) Patent No.: US 11,800,343 B2
(45) Date of Patent: Oct. 24, 2023

(54) EMERGENCY MONITORING APPLICATION MOBILITY MANAGEMENT

(71) Applicant: International Business Machines Corporation, Armonk, NY (US)

(72) Inventors: Craig M. Trim, Ventura, CA (US);
Timothy Davis, Upton, MA (US);
Gandhi Sivakumar, Victoria (AU);
Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 17/456,787

(22) Filed: Nov. 29, 2021

(65) Prior Publication Data
US 2023/0171576 A1    Jun. 1, 2023

(51) Int. Cl.
*H04W 4/90* (2018.01)
*H04W 52/02* (2009.01)

(52) U.S. Cl.
CPC ......... *H04W 4/90* (2018.02); *H04W 52/0264* (2013.01)

(58) Field of Classification Search
CPC ............... H04W 4/90; H04W 52/0264; H04W 52/0261; H04W 52/0277; Y02D 30/70
See application file for complete search history.

(56) References Cited

U.S. PATENT DOCUMENTS 5,579,353 A    11/1996  Parmenter
7,730,340 B2    6/2010  Hu et al.
10,691,138 B2   6/2020  Antunes Marques Esteves
10,939,216 B2   3/2021  Solum et al.
2005/0097376 A1*  5/2005  Weinberger ............. G06F 1/329
                                                     713/320

(Continued)

FOREIGN PATENT DOCUMENTS

CN    107276179 A    10/2017

OTHER PUBLICATIONS

Anonymous, "Method and Apparatus for Overheating Management in 5gEnabledMobileDevices," An IP.com Prior art Data base Technical Disclosure, IPCOM000266337D, Jul. 5, 2021, 9 pages. (Year: 2021).*

(Continued)

*Primary Examiner* — Farid Seyedvosoghi
(74) *Attorney, Agent, or Firm* — Yee & Associates, P.C.

(57) ABSTRACT

Emergency monitoring application mobility management is provided. A portion of battery power on a mobile device is reserved for an emergency monitoring application between defined boundaries of a certain area based on analysis of a profile identifying battery consumption of each respective application running on the mobile device. A dedicated logical communication channel is established with the mobile device that the emergency monitoring application connects to in a detected emergency situation between the defined boundaries of the certain area. The dedicated logical communication channel is utilized to shut down a number of applications running on the mobile device during the detected emergency situation so that the reserved portion of battery power is retained to run the emergency monitoring application on the mobile device between the defined boundaries of the certain area during the detected emergency situation.

17 Claims, 8 Drawing Sheets

(56) References Cited

U.S. PATENT DOCUMENTS

| | | | | |
|---|---|---|---|---|
| 2005/0125701 | A1* | 6/2005 | Hensbergen | G06F 1/329 |
| | | | | 713/320 |
| 2010/0145643 | A1* | 6/2010 | Katpelly | H04W 52/0264 |
| | | | | 702/63 |
| 2012/0047379 | A1* | 2/2012 | Chen | G06F 1/26 |
| | | | | 713/320 |
| 2012/0210325 | A1* | 8/2012 | de Lind van Wijngaarden | |
| | | | | H04W 52/0258 |
| | | | | 718/103 |

OTHER PUBLICATIONS

Council on Foundations, "Disaster Preparedness and Recovery Plan," Version 1.1, copyright 2021, 59 pages. https://www.cof.org/sites/default/files/documents/files/DisasterandRecoveryPlan.pdf.

Anonymous, "Method and System for Preserving Reserve Battery Power in Mobile Devices for Emergency Situations," An IP.com Prior Art Database Technical Disclosure, IPCOM000246429D, Jun. 6, 2016, 2 pages.

Anonymous, "Method for Dynamic Event Aware Energy Reservation," An IP.com Prior Art Database Technical Disclosure, IPCOM000262832D, Jul. 5, 2020, 6 pages.

Anonymous, "Method and Apparatus for Overheating Management in 5g Enabled Mobile Devices," An IP.com Prior Art Database Technical Disclosure, IPCOM000266337D, Jul. 5, 2021, 9 pages.

TSA, "The Impact of Analogue to Digital Migration on Technology Enabled Care," TSA Industry Update, Jan. 2021, 9 pages.

"The Benefits of Multiple CPU Cores in Mobile Devices," Whitepaper, NVIDIA Corporation, copyright 2021, 23 pages. https://www.nvidia.com/content/PDF/tegra_white_papers/Benefits-of-Multi-core-CPUs-in-Mobile-Devices_Ver1.2.pdf.

"Battery Sizing & Design Service," copyright Swiss Power Solutions 2021, accessed Nov. 18, 2021, 3 pages. https://swisspowersolutions.com/battery-sizing-design-service/.

"Load Profile," Open Electrical, Apr. 30, 2013, copyright Scribd Inc. 2021, accessed Nov. 18, 2021, 6 pages. https://www.scribd.com/document/242134446/Load-Profile-Open-Electrical.

* cited by examiner

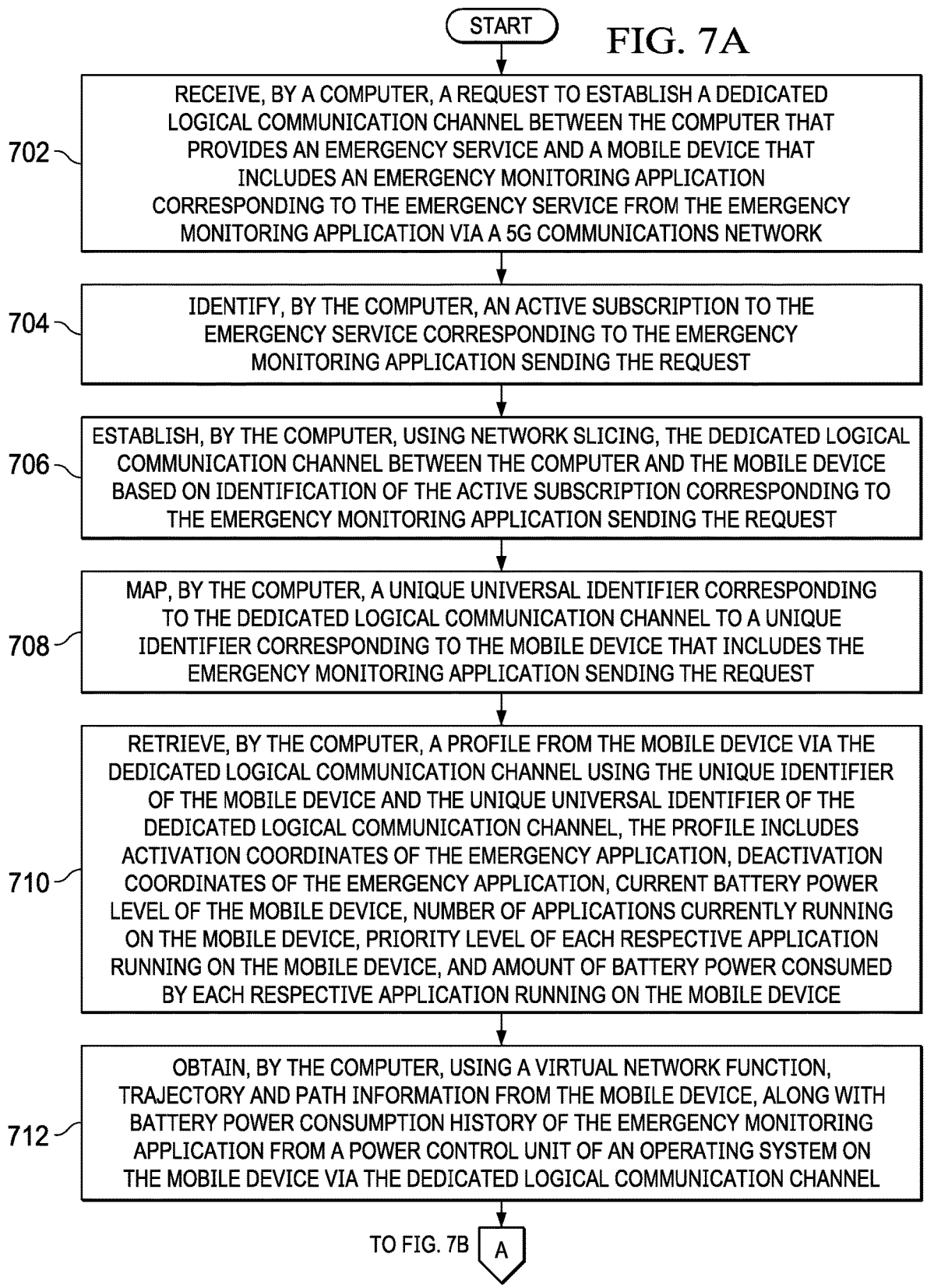

EMERGENCY MONITORING APPLICATION MOBILITY MANAGEMENT

BACKGROUND

1. Field

The disclosure relates generally to telecommunications and more specifically to determining a battery power requirement of an emergency monitoring application on a fifth-generation (5G)-enabled mobile device between activation and deactivation coordinates of the emergency monitoring application within a 5G telecommunications network based on mobility (trajectory and path) of the mobile device and load profiling of the emergency monitoring application to reserve a portion of battery power on the mobile device to only be used by the emergency monitoring application during a predicted run time of the emergency monitoring application on the mobile device between the activation and deactivation coordinates.

2. Description of the Related Art

Telecommunications are the means of electronic transmission of information over distances. The electronic transmission of information may be in the form of voice, data, text, images, or video. Telecommunications include a wide range of information-transmitting technologies and communications infrastructures, such as wired phones (e.g., landline phones), mobile devices (e.g., cellular phones), microwave communications, fiber optics, satellites, radio transmission, internet, and the like. A telecommunications network is an arrangement of computing and telecommunications resources for the electronic transmission of the information between locations.

In telecommunications, fifth-generation (5G) refers to a technology standard for broadband cellular networks. Enhanced mobile broadband is one aspect of 5G telecommunications networks that provides faster wireless connections and extends cellular coverage. Enhanced mobile broadband also provides support for more devices and more data in densely populated areas and enables high-bandwidth applications, such as augmented reality, virtual reality, mixed reality, and the like.

SUMMARY

According to one illustrative embodiment, a computer-implemented method is provided. A computer reserves a portion of battery power on a mobile device for an emergency monitoring application between defined boundaries of a certain area based on analysis of a profile identifying battery consumption of each respective application running on the mobile device. The computer establishes a dedicated logical communication channel with the mobile device that the emergency monitoring application connects to in a detected emergency situation between the defined boundaries of the certain area. The computer utilizes the dedicated logical communication channel to shut down a number of applications running on the mobile device during the detected emergency situation so that the reserved portion of battery power is retained to run the emergency monitoring application on the mobile device between the defined boundaries of the certain area during the detected emergency situation. According to other illustrative embodiments, a computer system and computer program product are provided.

BRIEF DESCRIPTION OF THE DRAWINGS

FIGS. 7A-7B are a flowchart illustrating a process for determining a battery power requirement of an emergency monitoring application on a mobile device in accordance with an illustrative embodiment.

DETAILED DESCRIPTION

Figure 1:
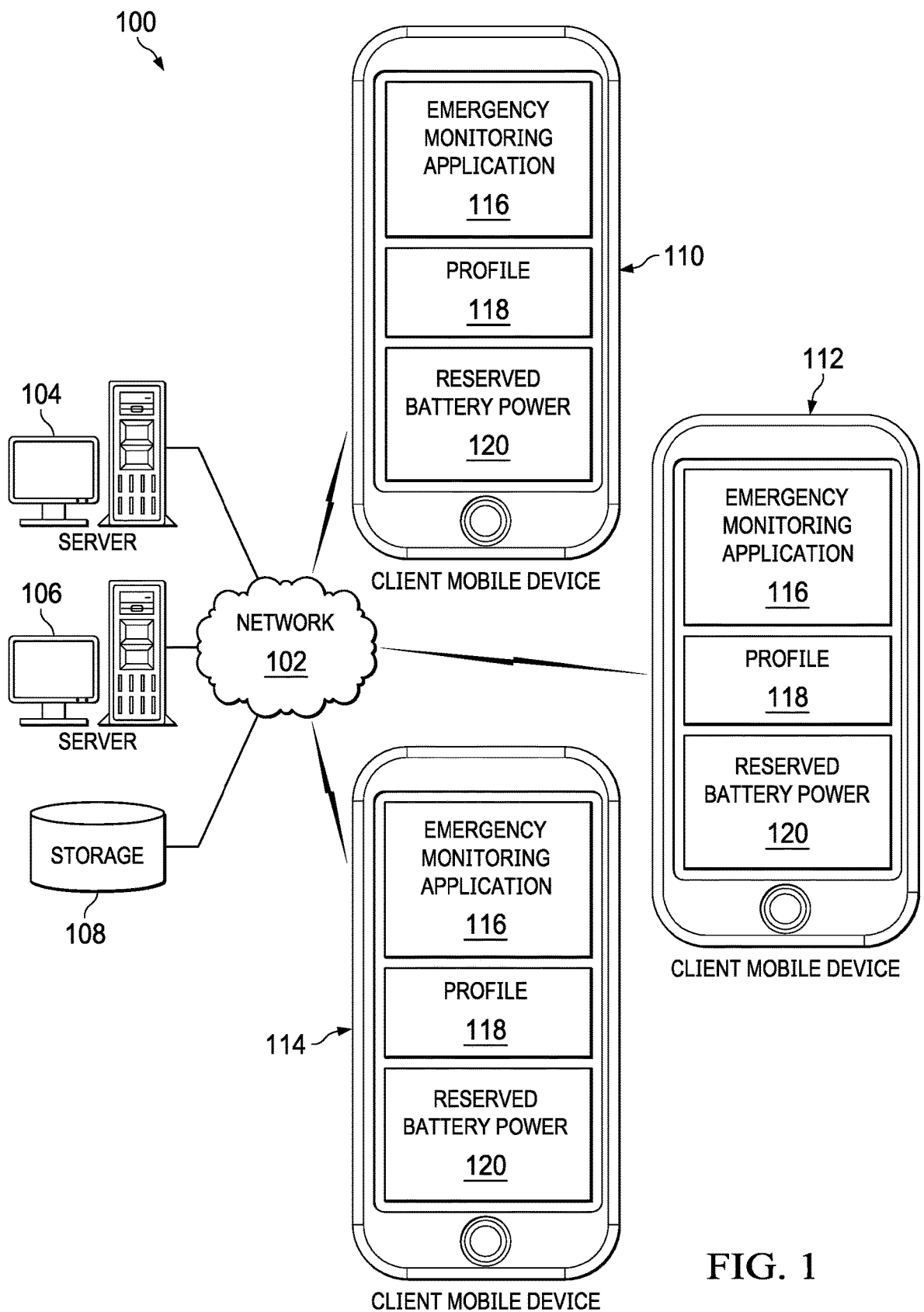
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
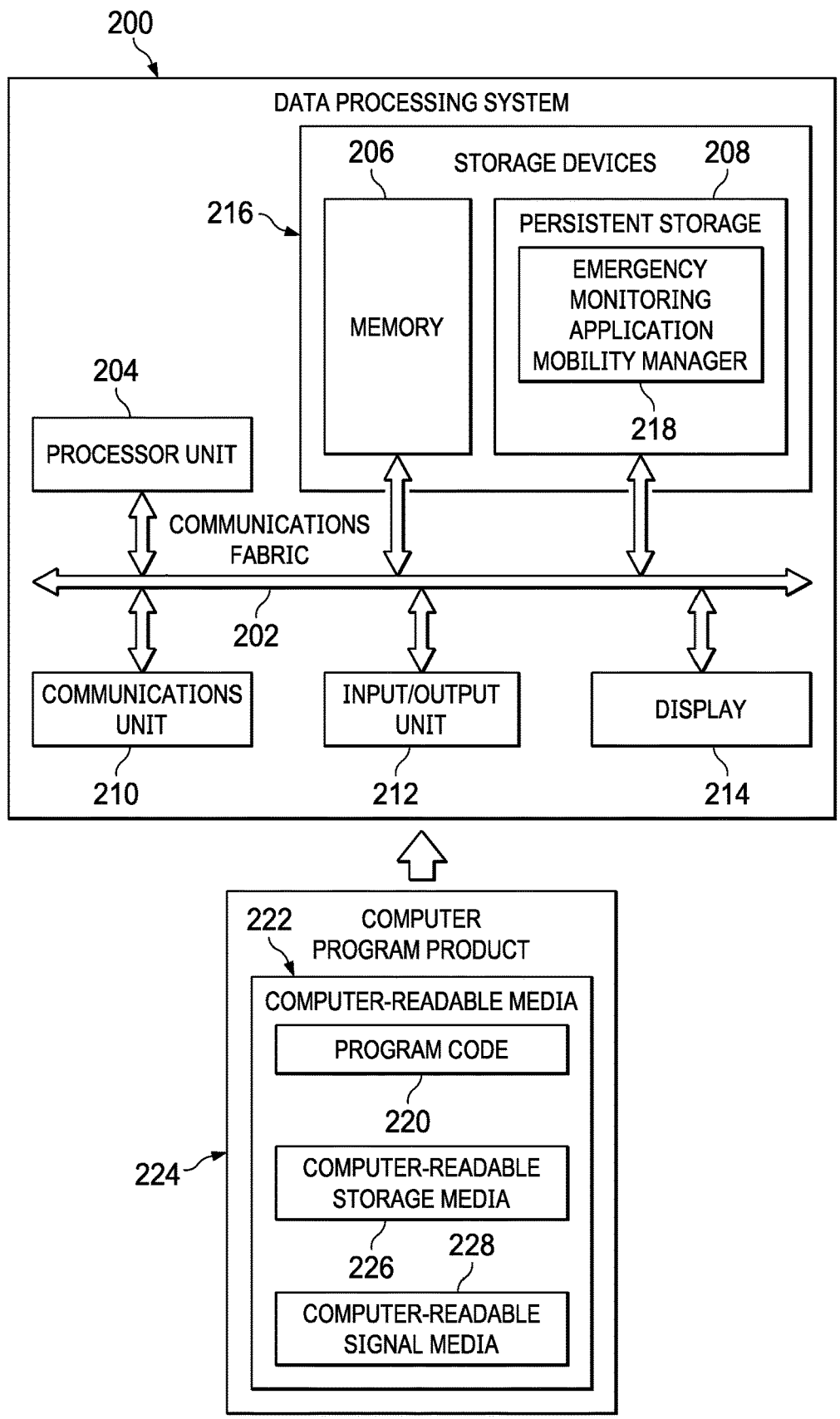
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. In this example, network data processing system 100 can represent a 5G telecommunications network.

Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more telecommunications centers. Alternatively, server 104 and server 106 may each represent multiple computing nodes in one or more cloud environments corresponding to one or more telecommunications entities or providers.

In addition, server 104 and server 106 may provide 5G telecommunications services to a plurality of mobile client device users. Further, server 104 and server 106 may provide mobility management services to emergency monitoring applications on the client mobile devices. Server 104 and server 106 can provide the mobility management services to emergency monitoring applications by determining a battery power requirement of a particular emergency monitoring application on a particular 5G-enabled client mobile device between activation and deactivation coordinates of that particular emergency monitoring application within the 5G telecommunications network based on trajectory and path of the client mobile device and load profiling of that particular emergency monitoring application to reserve a portion of battery power on the client mobile device to only be used by the emergency monitoring application during a predicted run time of the emergency monitoring application on the client mobile device between the activation and deactivation coordinates. Server 104 and server 106 can also provide a set of emergency service, which are subscribed to by the client mobile devices.

Client mobile device 110, client mobile device 112, and client mobile device 114 also connect to network 102. Client mobile devices 110, 112, and 114 are subscribing clients to the 5G telecommunications services, the emergency monitoring application mobility management services, and the emergency services provided by server 104 and server 106. In this example, client mobile devices 110, 112, and 114 are shown as smart phones with wireless communication links to network 102. However, it should be noted that client mobile devices 110, 112, and 114 are examples only and may represent other types of mobile data processing systems, such as, for example, laptop computers, handheld computers, cellular phones, smart watches, smart glasses, smart vehicles, portable gaming devices, and the like, with wireless communication links to network 102. Users of client mobile devices 110, 112, and 114 may utilize client mobile devices 110, 112, and 114 to utilize the services provided by server 104 and server 106.

Moreover, each of client mobile devices 110, 112, and 114 includes emergency monitoring application 116, profile 118, and reserved battery power 120. Emergency monitoring application 116 may represent the same type of emergency monitoring application in each respective client mobile device or a different type of emergency monitoring application. Emergency monitoring application 116 is capable of monitoring for and detecting an emergency situation and, in response to detecting the emergency situation, emergency monitoring application 116 can automatically connect to a subscribed emergency service provided by server 104 or server 106 to request assistance during the emergency situation. Profile 118 includes a plurality of different information corresponding to a respective client mobile device. Profile 118 may contain, for example, activation coordinates of emergency monitoring application 116, deactivation coordinates of emergency monitoring application 116, current battery power level of that particular client mobile device, number of applications currently running on that particular client mobile device, priority level of each respective application running on that particular client mobile device, amount of battery power consumed by each respective application running on that particular mobile device, historical battery power consumption of emergency monitoring application 116, and the like. Reserved battery power 120 represents an amount of battery power reserved for use only by emergency monitoring application 116 between the activation and deactivation coordinates during a detected emergency situation by emergency monitoring application 116.

Storage 108 is a network storage device capable of storing any type of data in a structured format or an unstructured format. In addition, storage 108 may represent a plurality of network storage devices. Further, storage 108 may store identifiers and network addresses for a plurality of servers, identifiers for a plurality of mobile client devices, identifiers for a plurality of mobile client device users, identifiers for different emergency services, identifiers for a plurality of dedicated logical communication channels corresponding to different mobile client devices, and the like. Furthermore, storage 108 may store other types of data, such as authentication or credential data that may include usernames, passwords, and the like associated with mobile client device users, for example.

In addition, it should be noted that network data processing system 100 may include any number of additional servers, client mobile devices, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client mobile device 110 over network 102 for use on client mobile device 110.

In the depicted example, network data processing system 100 may be implemented as a number of different types of communication networks, such as, for example, a 5G telecommunications network, an internet, an intranet, a wide area network, a local area network, a metropolitan area network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the emergency monitoring application mobility management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores emergency monitoring application mobility manager 218. However, it should be noted that even though emergency monitoring application mobility manager 218 is illustrated as residing in persistent storage 208, in an alternative illustrative embodiment, emergency monitoring application mobility manager 218 may be a separate component of data processing system 200. For example, emergency monitoring application mobility manager 218 may be a hardware component coupled to communication fabric 202 or a combination of hardware and software components. In another alternative illustrative embodiment, a first set of components of emergency monitoring application mobility manager 218 may be located in data processing system 200 and a second set of components of emergency monitoring application mobility manager 218 may be located in a second data processing system, such as, for example, server 106 in FIG. 1.

Emergency monitoring application mobility manager 218 controls the process of determining a battery power requirement of an emergency monitoring application on a 5G-enabled mobile device between activation and deactivation coordinates of the emergency monitoring application within a 5G telecommunications network based on trajectory and path of the mobile device and load profiling of the emergency monitoring application to reserve a portion of battery power on the mobile device to only be used by the emergency monitoring application during a predicted run time of the emergency monitoring application on the mobile device between the activation and deactivation coordinates in an event of an emergency situation. As a result, data processing system 200 operates as a special purpose computer system in which emergency monitoring application mobility manager 218 in data processing system 200 enables mobility management of an emergency monitoring application to reserve batter power for the emergency monitoring application during emergency situations. In particular, emergency monitoring application mobility manager 218 transforms data processing system 200 into a special purpose computer system as compared to currently available general computer systems that do not have emergency monitoring application mobility manager 218.

Communications unit 210, in this example, provides for communication with other computers, data processing systems, and client mobile devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, 5G, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

With the enablement of 5G technology, one aspect of 5G that impacts consumers is Enhanced Mobile Broadband (EMBB), which provides faster wireless connections and extends cellular coverage to previously underserved areas. EMBB also supports more devices and more data in dense locales and enables high-bandwidth applications, such as, for example, augmented reality, virtual reality, mixed reality, and the like. The focus of EMBB is on content and speed. EMBB enhances dynamic network configuration and management, placing reception and speed where needed. Increased bandwidth, massive Internet of Things data, and lower network latency are all incremental improvements over previous generation wireless networking. However, the impact of these improvements will be muted without network slicing. Network slicing offers a unique form of virtualization that allows multiple logical networks to share a common physical network infrastructure.

Most modern mobile devices are integrated with high-end hardware systems, which enables these mobile devices to accomplish a variety of tasks. These tasks may include, for example, Web browsing, video playback, mobile gaming, text messaging, and location-based services. Due to increased availability of high-speed mobile networks, such as, for example, 5G and Wi-Fi networks, these mobile devices can also be used for various performance-intensive tasks that were previously only performed by traditional desktop computers. Next generation mobile devices, such as, for example, super phones and tablets, will be used for a wide variety of complex tasks, such as, for example, online inline data transmission to cloud, online gaming, flash-based streaming of high-definition videos, visually rich gaming, video editing, simultaneous high-definition video downloads including video conferencing, and the like. These next generation devices will need high-capacity hardware to provision these functions at the same time. To support this provisioning, mobile device vendors may utilize multi-core processors to perform symmetrical multiprocessing, which delivers high performance. In such mobile device architectures, various processing tasks can be shared across the two cores.

In addition, users want extended battery power life on these mobile devices. In fact, battery power life is more important to users than brand, processor speed, camera quality, and the like according to consumer surveys. On one side, mobile device chipsets are becoming more energy efficient. However, on the other side, mobile applications are becoming more demanding in terms of processing power and battery power. Mobile devices are not only increasing in the amount of data used, but also in the speed of connections made. As increased battery size poses an increased risk of combustion or explosion, mobile application developers should have mobile applications conserve as much battery power on mobile devices as possible.

It is anticipated that a 5G-enabled mobile device will run multiple applications at the same time consuming more battery power to operate. Because of this increased battery power consumption, the battery of a 5G-enabled mobile device will drain more quickly. Under normal circumstances, this battery power drain is not hampering. However, this battery power drain can become an issue when a user of the 5G-enabled mobile device is in an emergency situation and needs to use the mobile device to request assistance but has very little battery power left (e.g., less than 5%). Current emergency applications run according to a defined location-based policy (e.g., an identified start location where the emergency application is automatically activated and an identified end location where the emergency application is automatically deactivated) during user mobility.

However, no mechanism currently exists that can determine battery power requirement of an emergency monitoring application based on trajectory and path of a user's mobility and identify emergency monitoring application load on a mobile device to reserve sufficient battery power on the mobile device during predicted operation of the emergency monitoring application on the mobile device. Further, no mechanism currently exists whereby a battery power reserve requirement for an emergency monitoring application on a mobile device can be dynamically computed based on load profiling of the emergency monitoring application on the mobile device. Moreover, no mechanism currently exists that can instruct an operating system of the mobile device to reserve sufficient battery power for an upcoming predicted run of the emergency monitoring application on the mobile device.

Illustrative embodiments provide a mobility management service that operates in a 5G service orchestration plane to retrieve a location-based policy of an emergency monitoring application on a subscribing client mobile device, perform load profiling of the emergency monitoring application on the mobile device, calculate an amount of battery power reserve for the emergency monitoring application, and instruct the operating system on the mobile device to reserve the amount of battery power for the emergency monitoring application based on a valid subscription with an emergency service provided by illustrative embodiments in the 5G service orchestration plane.

Illustrative embodiments operate at the 5G service orchestration plane with an existing programmability framework, identify emergency monitoring applications on mobile devices with their corresponding activation/deactivation coordinates (e.g., the location-based policy with starting and ending coordinates for automatically activating and deactivating the emergency applications), calculate the location, trajectory, and paths of the mobile devices, and accordingly perform load profiling of emergency monitoring applications to reserve sufficient battery power to operate the emergency applications between respective identified activation/deactivation coordinates during detected emergency situations.

Illustrative embodiments comprise a mobility management service, which runs in the orchestration plane of a 5G telecommunications network and includes an emergency service in the programmability framework, that is subscribed to by mobility-aware (e.g., location-aware) emergency monitoring applications on mobile devices. An emergency monitoring application, which subscribes to the mobility management service provided by illustrative embodiments, establishes a dedicated logical communication channel (e.g., a secure 5-G channel) that is used to send geolocation data corresponding to the mobile device, the activation/deactivation coordinates of the emergency monitoring application, and other related information to the mobility management service.

Upon registration of the emergency monitoring application with the mobility management service, illustrative embodiments retrieve the needed information from various resources on the corresponding mobile device via the dedicated logical communication channel and store the retrieved information in a set of metadata mapper objects. For example, if the emergency service of illustrative embodiments within the 5G orchestrator plane has an active and enabled subscription for a given emergency monitoring application on a mobile device, then the mobile device performs additional computations to determine when the mobile device is in a region for activation of the emergency monitoring application. When the mobile device is between activation/deactivation coordinates X and Y, respectively, the emergency monitoring application is running on the mobile device, which is capturing location-based data and transmitting that location-based data to the mobility management service of illustrative embodiments over the established dedicated logical communication channel. As the capturing and transmitting of the location-based data needs a certain amount of battery power, illustrative embodiments can determine the power requirements for a given emergency monitoring application by load profiling the emergency monitoring application based on location, trajectory, and path of the mobile device and a per unit time-power calculation for that particular emergency monitoring application.

When the mobile device initiates the emergency monitoring application, the emergency monitoring application establishes the dedicated logical communication channel with a server hosting the mobility management service of illustrative embodiments using a 5G network slicing model. After establishment of the dedicated logical communication channel, the mobility management service knows that the emergency monitoring application is active and running on the mobile device. The mobility management service of illustrative embodiments collects information regarding the dedicated logical communication channel established by the emergency monitoring application from a virtual network function and locates the subscription information corresponding to that particular emergency monitoring application from the set of metadata mapper objects.

Upon detecting that the emergency monitoring application is a valid subscriber to the mobility management service, the mobility management service initializes a media access control address-based communication with the emergency service corresponding to the emergency monitoring application. The mobility management service of illustrative embodiments retrieves the needed information, such as, for example, unique identifier corresponding to the mobile device, emergency monitoring application activation coordinates, emergency monitoring application deactivation coordinates, current battery power level of the mobile device, number and type of applications currently running on the mobile device, priority level of each respective application running on the mobile device, amount of battery power consumed by each respective application running on the mobile device, amount of processor power utilized by each respective application running on the mobile device, and other related data, which is contained in a profile on the mobile device, using newly established sockets between the corresponding mobile device and the server providing the mobility management service of illustrative embodiments.

The mobility management service of illustrative embodiments invokes a virtual network function to obtain trajectory (e.g., location and velocity) and path information from the mobile device when the mobility management service needs to perform load profiling of the emergency monitoring application. The mobility management service provides the virtual network function with a unique universal identifier of the established dedicated logical communication channel between the emergency monitoring application and the mobility management service in order for the virtual network function to obtain the trajectory and path information corresponding to the mobile device. Optionally, the mobility management service can perform collection of trajectory and path information corresponding to the mobile device using media access control address-based streaming from the client emergency monitoring application.

The mobility management service utilizes the collected trajectory and path information to perform time computations based on distance to velocity mapping. With these time computations, the mobility management service of illustrative embodiments can identify how long (e.g., a calculated amount of time) the client emergency monitoring application will need to remain active on the mobile device.

Illustrative embodiments utilize a power control unit (e.g., a probed module) within an operating system of the mobile device to collect the battery power consumption history of the emergency monitoring application for a defined number of previous runs of the emergency monitoring application and send the battery power consumption history data to the mobility management service. A load profiler of the mobility management service calculates an overall battery power requirement for a determined run time of the emergency monitoring application based on the received battery power consumption history data corresponding to the emergency monitoring application. The mobility management service then sends the calculated overall battery power requirement for the determined run time of the emergency monitoring application to the power control unit of the operating system on the mobile device using the dedicated virtual communication channel. Alternatively, the mobility management service can utilize any other existing data transmission mechanisms or out-of-band protocol implementation to send the overall battery power requirement to the power control unit of the operating system.

After receiving the overall battery power requirement from the mobility management service, the power control unit then calculates a specific amount of battery power to reserve for the emergency monitoring application based on current battery power level (e.g., percentage value) of the mobile device and the cell architecture of the 5G telecommunications network. The power control unit of the operating system reserves the specified amount of battery power for the emergency monitoring application on the mobile device, which is only used for the emergency monitoring application, and initiates a power savings calculation, if needed.

Thus, illustrative embodiments ensure that the emergency monitoring application receives its reserved amount of battery power for the specified operational time period between activation and deactivation coordinates for the emergency monitoring application. In other words, illustrative embodiments instruct or direct the power control unit of the operating system to release the battery power reserves to the emergency monitoring application when the mobile device reaches the target activation coordinates. Moreover, illustrative embodiments can determine which particular applications running on the mobile device to shut down during a detected emergency situation and direct the power control unit of the operating system on the mobile device to shut down those particular applications in a priority order (order of importance during the detected emergency situation) starting from lowest priority (least important) to ensure that the battery power requirement reserved for the emergency monitoring application is maintained above a defined minimum battery power reserve threshold level for the emergency monitoring application. In addition, illustrative embodiments can increase the amount of reserved battery power by a defined percentage to run other emergency applications or high priority applications of the mobile device during the detected emergency situation. Furthermore, the power control unit of the operating system updates the emergency monitoring application power consumption history after the mobile device reaches the deactivation coordinates.

As a result, the 5G-enabled mobile device will have the required amount of battery power to run the emergency monitoring application during a detected emergency situation by predicting the emergency monitoring application's battery power requirements based on mobile device trajectory mapping and emergency monitoring application load profiling to reserve the required amount of battery power during operation of the emergency monitoring application between the activation and deactivation coordinates. Thus, illustrative embodiments can prevent a circumstance where a mobile device runs out of battery power to run the emergency monitoring application when a user is experiencing an emergency situation (e.g., a vehicular accident) and needing assistance.

Accordingly, illustrative embodiments provide one or more technical solutions that overcome a technical problem with determining battery power requirements of emergency monitoring applications based on trajectory and path of users' mobility within a 5G telecommunications network. As a result, these one or more technical solutions provide a technical effect and practical application in the field of 5G telecommunications networks.

Figure 3:
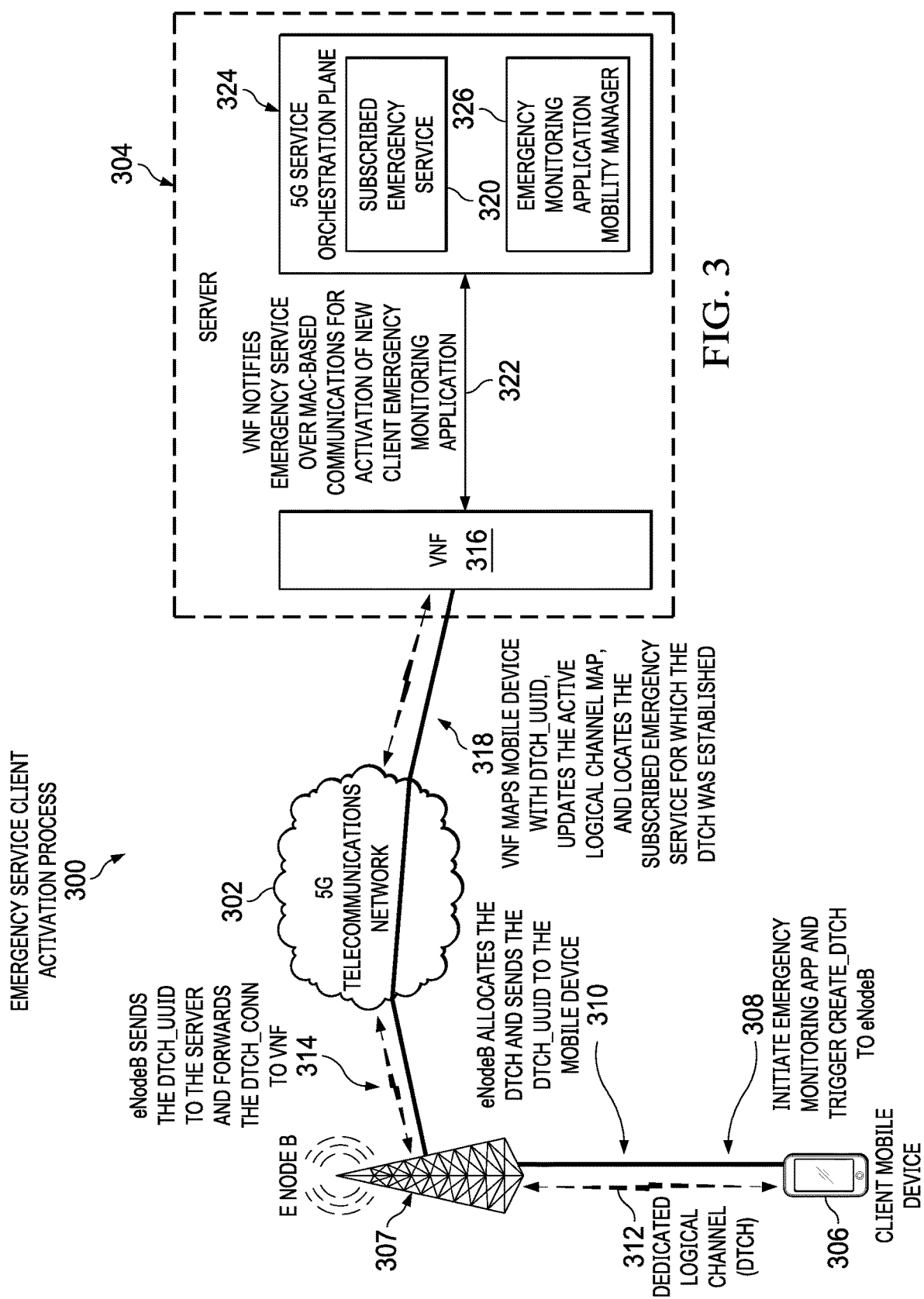
FIG. 3 is a diagram illustrating an example of an emergency service client activation process in accordance with an illustrative embodiment.

With reference now to FIG. 3, a diagram illustrating an example of an emergency service client activation process is depicted in accordance with an illustrative embodiment. Emergency service client activation process 300 is implemented in 5G telecommunications network 302. 5G telecommunications network 302 may be, for example, network data processing system 100 in FIG. 1. Emergency service client activation process 300 includes hardware and software components for activating a subscription to an emergency service by an emergency monitoring application on a client mobile device.

In this example, emergency service client activation process 300 includes server 304, client mobile device 306, and Evolved Node B (eNodeB) 307. However, it should be noted that emergency service client activation process 300 is intended as an example only and may include any number of servers, client mobile devices, and eNodeBs. Server 304 may be, for example, server 104 in FIG. 1 or data processing system 200 in FIG. 2. Client mobile device 306 may be, for example, client mobile device 110 in FIG. 1. eNodeB 307 represents one of a plurality of base stations in 5G telecommunications network 302 capable of performing radio network control functions, along with creating mobile network coverage.

When an emergency monitoring application on a client mobile device establishes a dedicated logical communication channel to a virtual network function in a control plane of 5G telecommunications network 302, the virtual network function allocates dedicated bandwidth based on predefined bandwidth and quality of service class identifier policies and sends activation coordinates (e.g., trigger) of the emergency monitoring application to a mobility manager of illustrative embodiments for activating a subscription to an emergency service in the control plane by the emergency monitoring application on the client mobile device. For example, at 308, client mobile device 306 initiates the emergency monitoring application on client mobile device 306 and triggers a create dedicated logical communication channel message to eNodeB 307. At 310, in response to receiving the create dedicated logical communication channel message from client mobile device 306, eNodeB 307 allocates dedicated logical channel (DTCH) 312 and sends the unique universal identifier corresponding to DTCH 312 to client mobile device 306.

At 314, eNodeB 307 sends the unique universal identifier corresponding to DTCH 312 to server 304 and forwards the connection with DTCH 312 to virtual network function (VNF) 316 via 5G telecommunications network 302. At 318, VNF 316 maps client mobile device 306 with the unique universal identifier corresponding to DTCH 312, updates the active dedicated logical channel map, and locates subscribed emergency service 320 for which DTCH 312 was established.

At 322, VNF 316 notifies subscribed emergency service 320 via a media access control address-based communication for activation of a new client emergency monitoring application on client mobile device 306. Subscribed emergency service 320 is included in 5G service orchestration plane 324, along with emergency monitoring application mobility manager 326. 5G service orchestration plane 324 of 5G telecommunications network 302 provides control of subscribed emergency service 320. Emergency monitoring application mobility manager 326 may be, for example, emergency monitoring application mobility manager 218 in FIG. 2.

Figure 4:
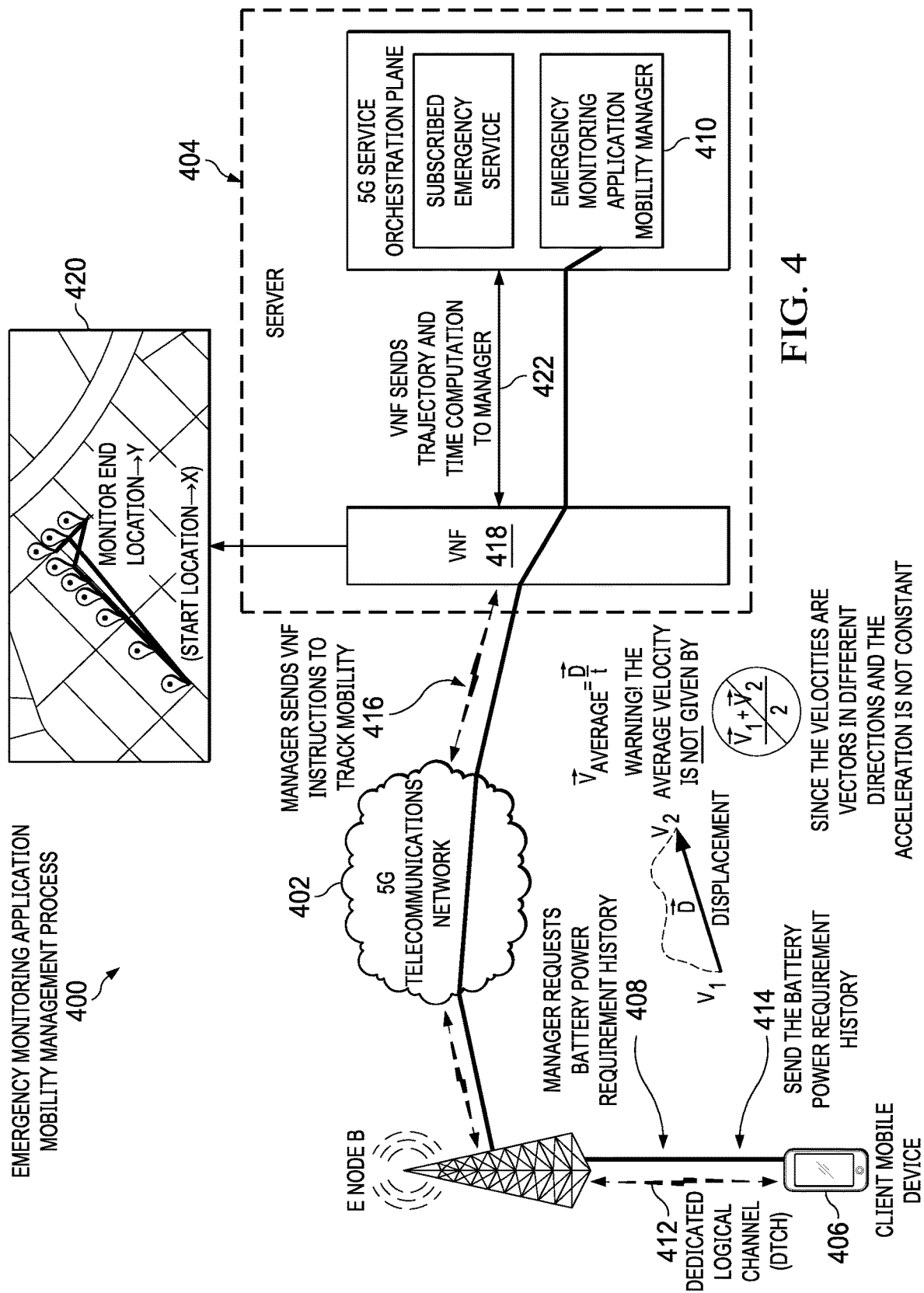
FIG. 4 is a diagram illustrating an example of an emergency monitoring application mobility management process in accordance with an illustrative embodiment.

With reference now to FIG. 4, a diagram illustrating an example of an emergency monitoring application mobility management process is depicted in accordance with an illustrative embodiment. Emergency monitoring application mobility management process 400 is implemented in 5G telecommunications network 402. 5G telecommunications network 402 may be, for example, 5G telecommunications network 302 in FIG. 3. Emergency monitoring application mobility management process 400 includes hardware and software components for managing mobility of emergency monitoring applications on client mobile devices within 5G telecommunications network 402.

In this example, emergency monitoring application mobility management process 400 includes server 404 and client mobile device 406, such as, for example, server 304 and client mobile device 306 in FIG. 3. At 408, emergency monitoring application mobility manager 410 requests a battery power requirement history corresponding to an emergency monitoring application on client mobile device 406 from a power control unit of an operating system on client mobile device 406 via dedicated logical channel (DTCH) 412. At 414, in response to the request for the battery power requirement history corresponding to the emergency monitoring application on client mobile device 406, the power control unit of the operating system on client mobile device 406 sends the battery power requirement history to emergency monitoring application mobility manager 410 via DTCH 412.

At 416, emergency monitoring application mobility manager 410 sends virtual network function (VNF) 418 instructions to track mobility of client mobile device 406 using trajectory mapping 420. At 422, VNF 418 sends trajectory and time computations based on trajectory mapping 420 to emergency monitoring application mobility manager 410 via media access control address-based communication to perform load profiling of the emergency monitoring application.

Figure 5:
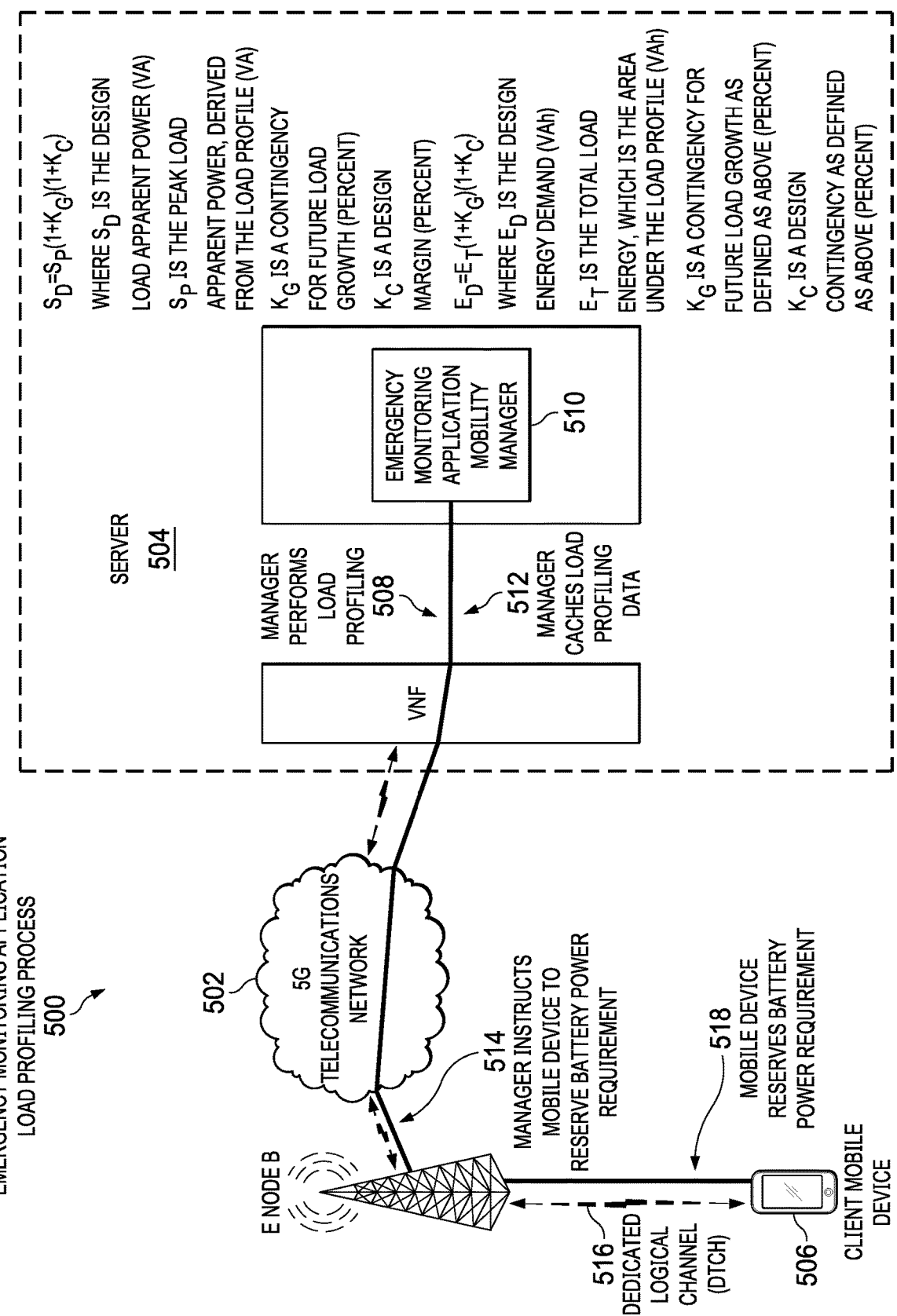
FIG. 5 is a diagram illustrating an example of an emergency monitoring application load profiling process in accordance with an illustrative embodiment.

With reference now to FIG. 5, a diagram illustrating an example of an emergency monitoring application load profiling process is depicted in accordance with an illustrative embodiment. Emergency monitoring application load profiling process 500 is implemented in 5G telecommunications network 502. 5G telecommunications network 502 may be, for example, 5G telecommunications network 402 in FIG. 4. Emergency monitoring application load profiling process 500 includes hardware and software components for performing load profiling of emergency monitoring applications on client mobile devices within 5G telecommunications network 502.

In this example, emergency monitoring application load profiling process 500 includes server 504 and client mobile device 506, such as, for example, server 404 and client mobile device 406 in FIG. 4. At 508, emergency monitoring application mobility manager 510 performs load profiling of an emergency monitoring application on client mobile device 506 based on the trajectory and time computations generated by a virtual network function, such as, for example, virtual network function 418 in FIG. 4. At 512, emergency monitoring application mobility manager 510 caches the load profiling data corresponding to the emergency monitoring application.

At 514, emergency monitoring application mobility manager 510, via dedicated logical channel 516, instructs the power control unit of the operating system on client mobile device 506 to reserve a battery power requirement corresponding to the emergency monitoring application that was based on the load profiling data corresponding to the emergency monitoring application. At 518, in response to receiving the instructions from emergency monitoring application mobility manager 510, the power control unit of the operating system on client mobile device 506 reserves the battery power requirement corresponding to the emergency monitoring application. The reserved battery power requirement corresponding to the emergency monitoring application may be, for example, reserved battery power 120 in FIG. 1. Further, emergency monitoring application mobility manager 510 can instruct the power control unit of the operating system on client mobile device 506 to decrease processor cycles and/or shut down applications on client mobile device 506 to maintain the reserved battery power requirement for the emergency monitoring application above a minimum threshold level during operation in an emergency situation.

Figure 6:
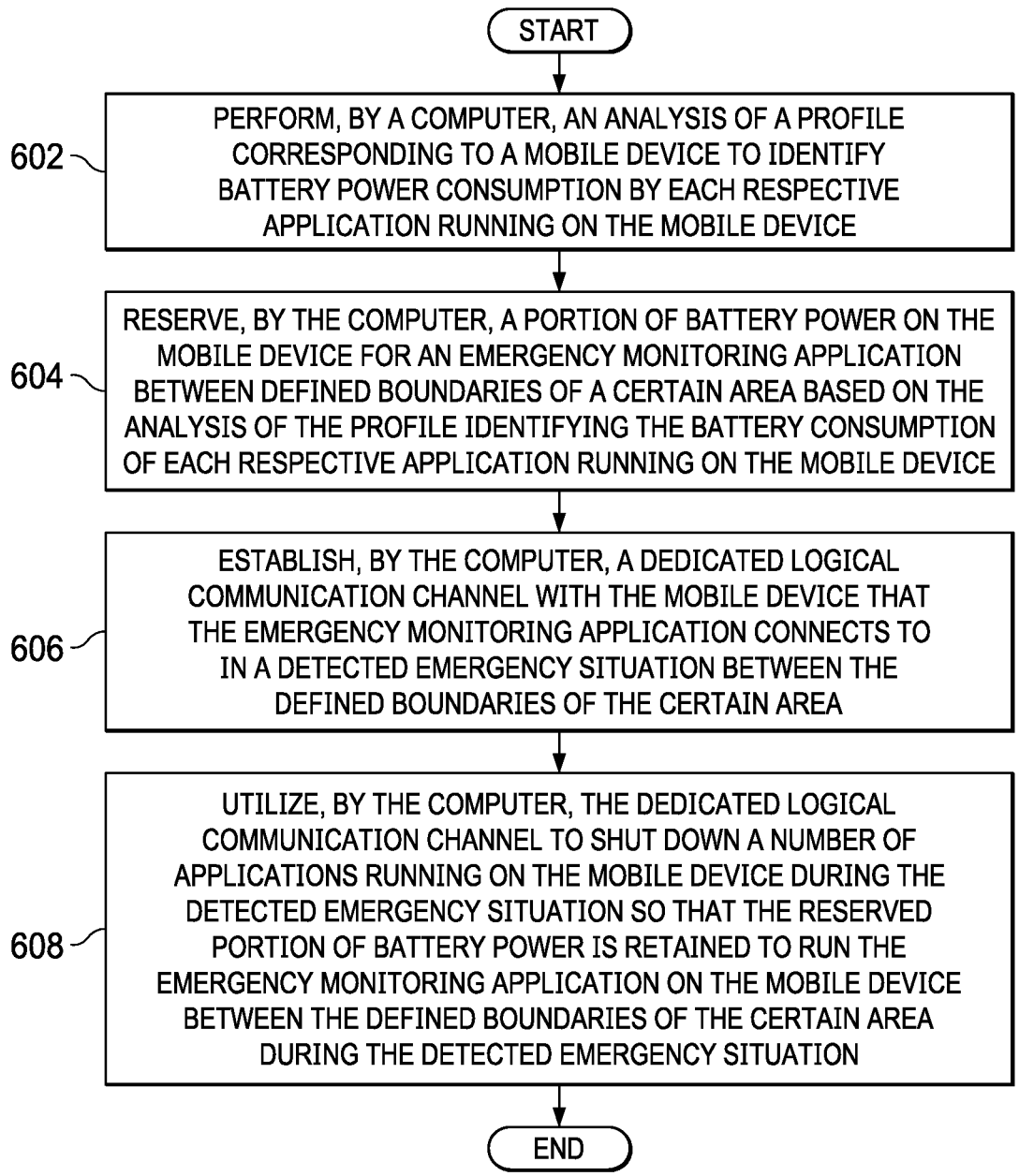
FIG. 6 is a flowchart illustrating a process for reserving a portion of battery power on a mobile device for an emergency monitoring application in accordance with an illustrative embodiment.

With reference now to FIG. 6, a flowchart illustrating a process for reserving a portion of battery power on a mobile device for an emergency monitoring application is shown in accordance with an illustrative embodiment. The process shown in FIG. 6 may be implemented in a computer, such as, for example, server 104 in FIG. 1 or data processing system 200 in FIG. 2. For example, the process shown in FIG. 6 may be implemented in emergency monitoring application mobility manager 218 in FIG. 2.

The process begins when the computer performs an analysis of a profile corresponding to a mobile device to identify battery power consumption by each respective application running on the mobile device (step 602). It should be noted that the computer runs a 5G service orchestration plane in a 5G telecommunications network, such as, for example, 5G service orchestration plane 324 of 5G telecommunications network 302 in FIG. 3. The computer reserves a portion of battery power on the mobile device for an emergency monitoring application between defined boundaries of a certain area based on the analysis of the profile identifying the battery consumption of each respective application running on the mobile device (step 604).

The computer establishes a dedicated logical communication channel with the mobile device that the emergency monitoring application connects to in a detected emergency situation between the defined boundaries of the certain area (step 606). The detected emergency situation may be, for example, an automobile accident indicated by rapid deceleration of the mobile device over a short distance and no further movement, injury due to a fall indicated by rapid acceleration of the mobile device over a short distance and then no movement, or the like. The defined boundaries may be, for example, activation coordinates and deactivation coordinates of the emergency monitoring application. The certain area may be, for example, a particular section of a given interstate highway system, a wilderness park, a mountain range, a particular region of a state, a foreign country, or the like. In addition, the computer utilizes the dedicated logical communication channel to shut down a number of applications running on the mobile device during the detected emergency situation so that the reserved portion of battery power is retained to run the emergency monitoring application on the mobile device between the defined boundaries of the certain area during the detected emergency situation (step 608). Thereafter, the process terminates.

Figure 7B:
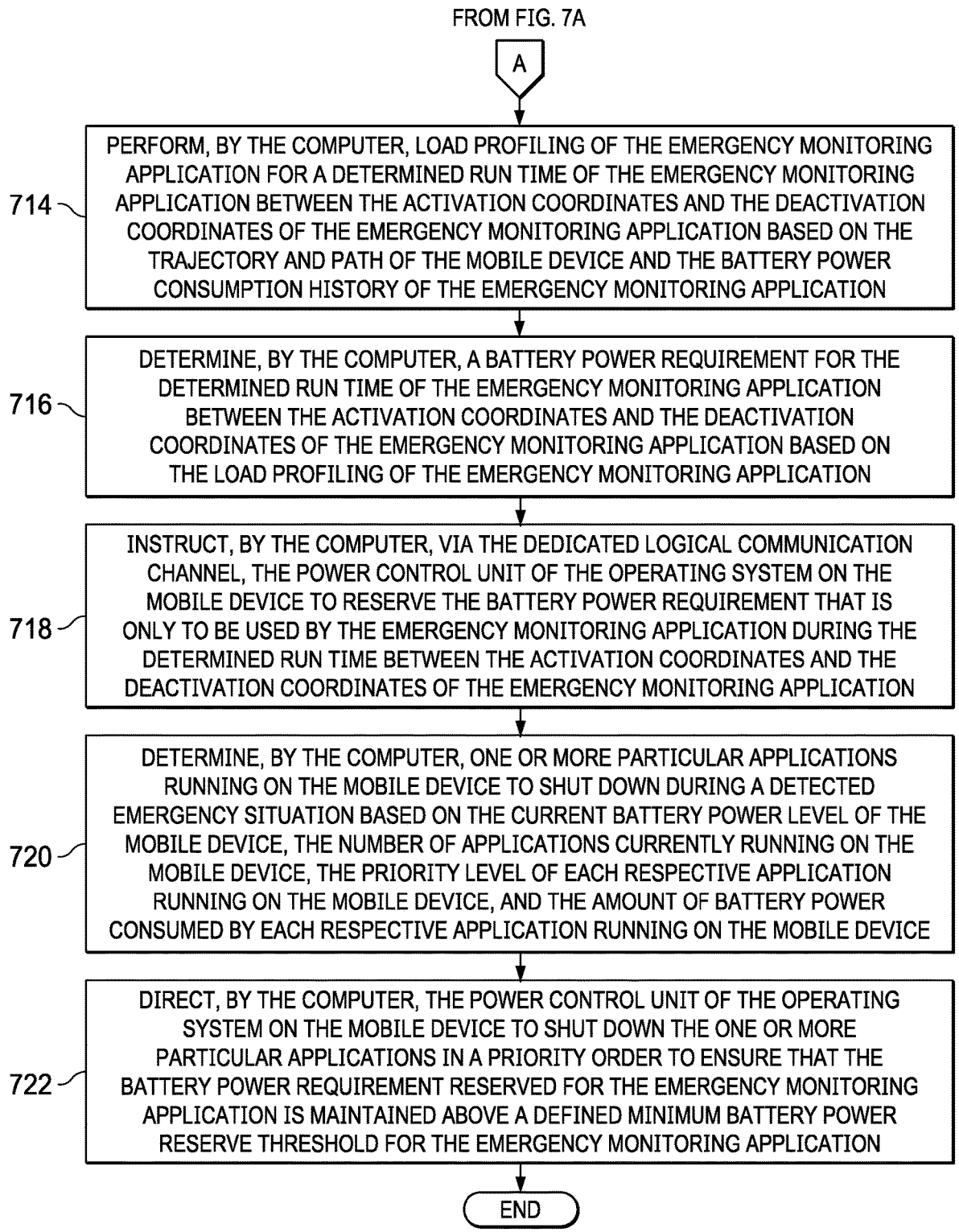

With reference now to FIGS. 7A-7B, a flowchart illustrating a process for determining a battery power requirement of an emergency monitoring application on a mobile device is shown in accordance with an illustrative embodiment. The process shown in FIGS. 7A-7B may be implemented in a computer, such as, for example, server 104 in FIG. 1 or data processing system 200 in FIG. 2. For example, the process shown in FIGS. 7A-7B may be implemented in emergency monitoring application mobility manager 218 in FIG. 2.

The process begins when the computer receives a request to establish a dedicated logical communication channel between the computer that provides an emergency service and a mobile device that includes an emergency monitoring application corresponding to the emergency service from the emergency monitoring application via a 5G communications network (step 702). The dedicated logical communication channel may be, for example, dedicated logical channel 312 in FIG. 3. The emergency service may be, for example, subscribed emergency service 320 in FIG. 3. The mobile device may be, for example, client mobile device 110 in FIG. 1 or client mobile device 306 in FIG. 3. The emergency monitoring application corresponding to the emergency service may be, for example, emergency monitoring application 116 in FIG. 1. The 5G telecommunications network, such as, for example, network data processing system 100 in FIG. 1 or 5G telecommunications network 302 in FIG. 3.

In response to receiving the request to establish the dedicated logical communication channel, the computer identifies an active subscription to the emergency service corresponding to the emergency monitoring application sending the request (step 704). The computer, using network slicing, establishes the dedicated logical communication channel between the computer and the mobile device based on identification of the active subscription corresponding to the emergency monitoring application sending the request (step 706). In addition, the computer maps a unique universal identifier corresponding to the dedicated logical communication channel to a unique identifier corresponding to the mobile device that includes the emergency monitoring application sending the request (step 708).

Further, the computer retrieves a profile from the mobile device via the dedicated logical communication channel using the unique identifier of the mobile device and the unique universal identifier of the dedicated logical communication channel (step 710). The profile includes, for example, activation coordinates of the emergency application, deactivation coordinates of the emergency application, current battery power level of the mobile device, number of applications currently running on the mobile device, priority level of each respective application running on the mobile device, amount of battery power consumed by each respective application running on the mobile device, and the like. Furthermore, the computer, using a virtual network function, obtains trajectory and path information from the mobile device, along with battery power consumption history of the emergency monitoring application from a power control unit of an operating system on the mobile device via the dedicated logical communication channel (step 712).

The computer performs load profiling of the emergency monitoring application for a determined run time of the emergency monitoring application between the activation coordinates and the deactivation coordinates of the emergency monitoring application based on the trajectory and path of the mobile device and the battery power consumption history of the emergency monitoring application (step 714). The computer determines a battery power requirement for the determined run time of the emergency monitoring application between the activation coordinates and the deactivation coordinates of the emergency monitoring application based on the load profiling of the emergency monitoring application (step 716).

The computer, via the dedicated logical communication channel, instructs the power control unit of the operating system on the mobile device to reserve the battery power requirement that is only to be used by the emergency monitoring application during the determined run time between the activation coordinates and the deactivation coordinates of the emergency monitoring application (step 718). Moreover, the computer determines one or more particular applications running on the mobile device to shut down during a detected emergency situation based on the current battery power level of the mobile device, the number of applications currently running on the mobile device, the priority level of each respective application running on the mobile device, and the amount of battery power consumed by each respective application running on the mobile device (step 720). The computer directs the power control unit of the operating system on the mobile device to shut down the one or more particular applications in a priority order to ensure that the battery power requirement reserved for the emergency monitoring application is maintained above a defined minimum battery power reserve threshold for the emergency monitoring application (step 722). Thereafter, the process terminates.

Thus, illustrative embodiments of the present invention provide a computer-implemented method, computer system, and computer program product for determining a battery power requirement of an emergency monitoring application on a 5G-enabled mobile device between activation and deactivation coordinates of the emergency monitoring application within a 5G telecommunications network based on trajectory and path of the mobile device and load profiling of the emergency monitoring application to reserve a portion of battery power on the mobile device to only be used by the emergency monitoring application during a predicted run time of the emergency monitoring application on the mobile device between the activation and deactivation coordinates. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

receiving, by a computer, a request to establish a dedicated logical communication channel between the computer that provides an emergency service and a mobile device that includes an emergency monitoring application corresponding to the emergency service from the emergency monitoring application via a 5G communications network;

identifying, by the computer, an active subscription to the emergency service corresponding to the emergency monitoring application sending the request to establish the dedicated logical communication channel in response to receiving the request;

establishing, by the computer, using network slicing, the dedicated logical communication channel between the computer and the mobile device based on identification of the active subscription corresponding to the emergency monitoring application sending the request;

reserving, by the computer, a portion of battery power on the mobile device for the emergency monitoring application between defined boundaries of a certain area based on analysis of a profile identifying battery consumption of each respective application running on the mobile device;

establishing, by the computer, the dedicated logical communication channel with the mobile device that the emergency monitoring application connects to in a detected emergency situation between the defined boundaries of the certain area; and utilizing, by the computer, the dedicated logical communication channel to shut down a number of applications running on the mobile device during the detected emergency situation so that the reserved portion of battery power is retained to run the emergency monitoring application on the mobile device between the defined boundaries of the certain area during the detected emergency situation.

2. The computer-implemented method of claim 1 further comprising:
performing, by the computer, the analysis of the profile corresponding to the mobile device to identify battery power consumption by each respective application running on the mobile device.

3. The computer-implemented method of claim 1 further comprising:
mapping, by the computer, a unique universal identifier corresponding to the dedicated logical communication channel to a unique identifier corresponding to the mobile device that includes the emergency monitoring application sending the request; and
retrieving, by the computer, the profile from the mobile device via the dedicated logical communication channel using the unique identifier of the mobile device and the unique universal identifier of the dedicated logical communication channel.

4. The computer-implemented method of claim 3, wherein the profile includes activation coordinates of the emergency monitoring application, deactivation coordinates of the emergency monitoring application, current battery power level of the mobile device, number of applications currently running on the mobile device, priority level of each respective application running on the mobile device, and amount of battery power consumed by each respective application running on the mobile device.

5. The computer-implemented method of claim 4 further comprising:
obtaining, by the computer, using a virtual network function, trajectory and path information from the mobile device along with battery power consumption history of the emergency monitoring application from a power control unit of an operating system on the mobile device via the dedicated logical communication channel; and
performing, by the computer, load profiling of the emergency monitoring application for a determined run time of the emergency monitoring application between the activation coordinates and the deactivation coordinates of the emergency monitoring application based on the trajectory and path of the mobile device and the battery power consumption history of the emergency monitoring application.

6. The computer-implemented method of claim 5 further comprising:
determining, by the computer, a battery power requirement for the determined run time of the emergency monitoring application between the activation coordinates and the deactivation coordinates of the emergency monitoring application based on the load profiling of the emergency monitoring application; and
instructing, by the computer, via the dedicated logical communication channel, the power control unit of the operating system on the mobile device to reserve the battery power requirement that is only to be used by the emergency monitoring application during the determined run time between the activation coordinates and the deactivation coordinates of the emergency monitoring application.

7. The computer-implemented method of claim 6 further comprising:
determining, by the computer, the number of applications running on the mobile device to shut down during the detected emergency situation based on the current battery power level of the mobile device, the number of applications currently running on the mobile device, the priority level of each respective application running on the mobile device, and the amount of battery power consumed by each respective application running on the mobile device; and
directing, by the computer, the power control unit of the operating system on the mobile device to shut down the number of applications in a priority order to ensure that the battery power requirement reserved for the emergency monitoring application is maintained above a defined minimum battery power reserve threshold for the emergency monitoring application.

8. A computer system comprising:
a bus system;
a storage device connected to the bus system, wherein the storage device stores program instructions; and
a processor connected to the bus system, wherein the processor executes the program instructions to:
receive a request to establish a dedicated logical communication channel between the computer system that provides an emergency service and a mobile device that includes an emergency monitoring application corresponding to the emergency service from the emergency monitoring application via a 5G communications network;
identify an active subscription to the emergency service corresponding to the emergency monitoring application sending the request to establish the dedicated logical communication channel in response to receiving the request;
establish, using network slicing, the dedicated logical communication channel between the computer system and the mobile device based on identification of the active subscription corresponding to the emergency monitoring application sending the request;
reserve a portion of battery power on the mobile device for the emergency monitoring application between defined boundaries of a certain area based on analysis of a profile identifying battery consumption of each respective application running on the mobile device;
establish the dedicated logical communication channel with the mobile device that the emergency monitoring application connects to in a detected emergency situation between the defined boundaries of the certain area; and
utilize the dedicated logical communication channel to shut down a number of applications running on the mobile device during the detected emergency situation so that the reserved portion of battery power is retained to run the emergency monitoring application on the mobile device between the defined boundaries of the certain area during the detected emergency situation.

9. The computer system of claim 8, wherein the processor further executes the program instructions to:
perform the analysis of the profile corresponding to the mobile device to identify battery power consumption by each respective application running on the mobile device.

10. The computer system of claim 8, wherein the processor further executes the program instructions to:
- map a unique universal identifier corresponding to the dedicated logical communication channel to a unique identifier corresponding to the mobile device that includes the emergency monitoring application sending the request; and
- retrieve the profile from the mobile device via the dedicated logical communication channel using the unique identifier of the mobile device and the unique universal identifier of the dedicated logical communication channel.

11. The computer system of claim 10, wherein the processor further executes the program instructions to:
- obtain, using a virtual network function, trajectory and path information from the mobile device along with battery power consumption history of the emergency monitoring application from a power control unit of an operating system on the mobile device via the dedicated logical communication channel; and
- perform load profiling of the emergency monitoring application for a determined run time of the emergency monitoring application between activation coordinates and deactivation coordinates of the emergency monitoring application based on the trajectory and path of the mobile device and the battery power consumption history of the emergency monitoring application.

12. The computer system of claim 11, wherein the processor further executes the program instructions to:
- determine a battery power requirement for the determined run time of the emergency monitoring application between the activation coordinates and the deactivation coordinates of the emergency monitoring application based on the load profiling of the emergency monitoring application; and
- instruct, via the dedicated logical communication channel, the power control unit of the operating system on the mobile device to reserve the battery power requirement that is only to be used by the emergency monitoring application during the determined run time between the activation coordinates and the deactivation coordinates of the emergency monitoring application.

13. A computer program product comprising a computer-readable storage medium having program instructions embodied therewith, the program instructions executable by a computer to cause the computer to perform a method of:
- receiving, by the computer, a request to establish a dedicated logical communication channel between the computer that provides an emergency service and a mobile device that includes an emergency monitoring application corresponding to the emergency service from the emergency monitoring application via a 5G communications network;
- identifying, by the computer, an active subscription to the emergency service corresponding to the emergency monitoring application sending the request to establish the dedicated logical communication channel in response to receiving the request;
- establishing, by the computer, using network slicing, the dedicated logical communication channel between the computer and the mobile device based on identification of the active subscription corresponding to the emergency monitoring application sending the request;
- reserving, by the computer, a portion of battery power on the mobile device for the emergency monitoring application between defined boundaries of a certain area based on analysis of a profile identifying battery consumption of each respective application running on the mobile device;
- establishing, by the computer, the dedicated logical communication channel with the mobile device that the emergency monitoring application connects to in a detected emergency situation between the defined boundaries of the certain area; and
- utilizing, by the computer, the dedicated logical communication channel to shut down a number of applications running on the mobile device during the detected emergency situation so that the reserved portion of battery power is retained to run the emergency monitoring application on the mobile device between the defined boundaries of the certain area during the detected emergency situation.

14. The computer program product of claim 13 further comprising:
- performing, by the computer, the analysis of the profile corresponding to the mobile device to identify battery power consumption by each respective application running on the mobile device.

15. The computer program product of claim 13 further comprising:
- mapping, by the computer, a unique universal identifier corresponding to the dedicated logical communication channel to a unique identifier corresponding to the mobile device that includes the emergency monitoring application sending the request; and
- retrieving, by the computer, the profile from the mobile device via the dedicated logical communication channel using the unique identifier of the mobile device and the unique universal identifier of the dedicated logical communication channel.

16. The computer program product of claim 15 further comprising:
- obtaining, by the computer, using a virtual network function, trajectory and path information from the mobile device along with battery power consumption history of the emergency monitoring application from a power control unit of an operating system on the mobile device via the dedicated logical communication channel; and
- performing, by the computer, load profiling of the emergency monitoring application for a determined run time of the emergency monitoring application between activation coordinates and deactivation coordinates of the emergency monitoring application based on the trajectory and path of the mobile device and the battery power consumption history of the emergency monitoring application.

17. The computer program product of claim 16 further comprising:
- determining, by the computer, a battery power requirement for the determined run time of the emergency monitoring application between the activation coordinates and the deactivation coordinates of the emergency monitoring application based on the load profiling of the emergency monitoring application; and
- instructing, by the computer, via the dedicated logical communication channel, the power control unit of the operating system on the mobile device to reserve the battery power requirement that is only to be used by the emergency monitoring application during the determined run time between the activation coordinates and the deactivation coordinates of the emergency monitoring application.

* * * * *